United States Patent Office 3,749,783
Patented July 31, 1973

3,749,783
URACIL THIOUREAS FOR REVIVING AN ANIMAL GIVEN AN OVERDOSE OF BARBITURATE
Arthur Berger, Skokie, Ill., and Edeltraut E. Borgaes, Sindelfingen, Germany, assignors to Baxter Laboratories, Inc., Morton Grove, Ill.
No Drawing. Original application Aug. 13, 1969, Ser. No. 849,890, now abandoned. Divided and this application Dec. 6, 1971, Ser. No. 205,281
Int. Cl. A61k 27/00
U.S. Cl. 424—251          1 Claim

ABSTRACT OF THE DISCLOSURE

Uracil thioureas having the general formula

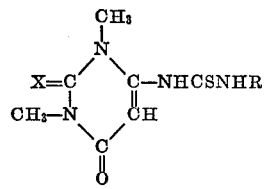

wherein X is selected from the group consisting of O and S, and wherein R is selected from the group consisting of lower alkyl having from 1 to about 4 carbon atoms, allyl, methallyl and phenyl, for example, 1-(2,4-diketo-1,3-dimethyl-1,2,3,4-tetrahydropyrimidin-6-yl)-3-methyl-2-thiourea, are pharmaceutically administered to animals given an overdose of barbiturate for reviving said animals.

---

This is a divisional of application Ser. No. 849,890, filed Aug. 13, 1969, now abandoned.

The present invention relates to novel organic uracil thioureas. More particularly, this invention relates to ring substituted uracil thioureas having the general formula:

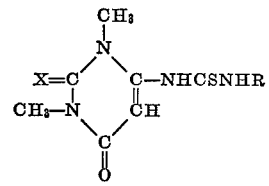

wherein X is selected from the group consisting of O and S, and wherein R is selected from the group consisting of lower alkyl having from 1 to about 4 carbon atoms, allyl, methallyl and phenyl.

The compounds of the present invention have been found to have potent central nervous system anti-depressant activity in animals. The ability of these compounds to revive animals given large doses of barbiturates have been shown in mice, rabbits and dogs. As such, the compounds of the present invention are useful agents for these and other animals as narcotic, barbiturate and anesthetic antagonists and as psychomotor and respiratory stimulants. These compounds are new compounds which have not been described heretofore in the literature and have unique barbiturate antagonist properties.

Certain 5-substituted positional isomers of the present compounds have been described heretofore as having cytostatic properties by Kumar, German Pat. 1,219,489. However, the 5-substituted uracil thioureas were found to be inactive central nervous system anti-depressants.

The synthesis of the novel uracil thioureas of the present invention can be effected by reacting 6-amino-1,3-dimethyluracil or 6-amino-1,3-dimethyl-2-thiouracil with an appropriate isothiocyanate. This synthesis is facilitated by reaction in the presence of a mutual solvent such as an amide, for example, dimethylformamide, or a sulfoxide, for example, dimethylsulfoxide.

The general reaction can be described by the following equation:

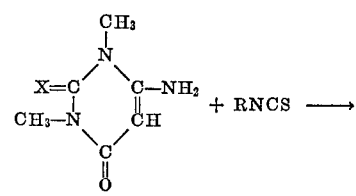

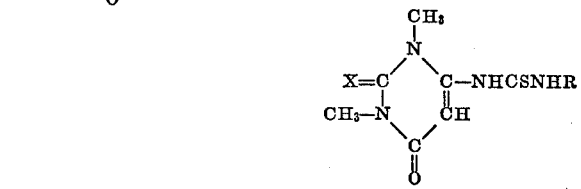

wherein X and R are as previously defined.

Illustrative of the isothiocyanates which can be used in the above reaction are the methyl, ethyl, n-propyl, isopropyl, n-butyl, isobutyl, allyl, methallyl and phenyl isothiocyanates and the like. The isothiocyanate reagents are generally available commercially or can be made by conventional procedures, for example, by reaction of an amine, $CS_2$ and NaOH as described in "Organic Syntheses," Coll. vol. III, p. 599 (1955), John Wiley & Sons, Inc., New York and London.

The compound 6-amino-1,3-dimethyluracil also is generally available commercially or can be made by conventional procedures, for example, by reaction of 1,3-dimethylurea with ethyl cyanoacetate as described by Traube, Ann., vol. 432, p. 281 (1923).

The corresponding 6-amino-1,3-dimethyl-2-thiouracil can also be made by conventional procedures, for example, by reaction of NN'-dimethylthiourea with cyanoacetic acid in acetic anhydride and acetic acid as described by Wooldridge and Stack, J. Chem. Soc'y 1962, pp. 1863–8 at 1865, and by Speer and Raymond, J. Am. Chem. Soc'y, vol. 75, pp. 114–115 (1953).

Although specific methods of preparation of the novel uracil thioureas of the present invention are described herein, it will be understood that these compounds are not limited to these specific methods of preparation. For example, an alternative method of preparation consists of methylating the ring unsubstituted uracil thiourea. Other methods of preparation of these compounds can be devised by those skilled in the art.

The novel compounds of the present invention have been administered both intravenously (i.v.) and intraperitoneally (i.p.) in suspensions of pectin and gum acacia solutions and in alcohol-water solutions. These routes of administration as well as the oral route of administration can be used. Other methods of administration will be apparent to those skilled in the art.

Effective barbiturate antagonist dosages can range from about one to 1,000 mg. per kg. of body weight and can take the form of tablets, powders, capsules, elixers and the like dosage forms in admixture with common solid and liquid diluents, carriers and adjuvants such as, for example, cornstarch, lactose, talc, stearic acid, magnesium stearate, gelatin, acacia and locust bean gums, alcohol, water, vegetable oils and the like materials. Other effective dosages of the novel compounds can be determined by reference to the specific examples set forth hereinafter. It has been unexpectedly found that high dosages of these compounds lose their toxicity in the presence of the active barbiturates and thus appear to be less toxic in the presence than in the absence of barbiturates.

The following examples will further illustrate the present invention although the invention is not limited to these specific examples. All percentages and parts herein are on a weight basis unless otherwise specified.

EXAMPLE I

Synthesis of 1-(2,4-diketo-1,3-dimethyl1,2,3,4-tetrahydropyrimidin-6-yl)-3-methyl-2-thiourea A mixture of 31.0 grams (0.20 mole) of 6-amino-1,3-dimethyluracil and 20.0 grams (0.27 mole) of methyl isothiocyanate in 400 ml. of dimethylformamide was heated under reflux for two hours after the reaction mixture had become clear for a total reaction time of 2.5 to 3 hours. The mixture was allowed to cool to about room temperature and then poured into chopped ice. The precipitate was collected and recrystallized from methanol with decolorizing carbon treatment. The yield was 31.1 grams (68% of the theoretical) of light yellow crystals of 1-(2,4-diketo-1,3-dimethyl - 1,2,3,4 - tetrahydropyrimidin-6-yl)-3-methyl-2-thiourea, M.P. 230–1° C.

EXAMPLE II

Synthesis of 1-n-butyl-3-(2,4-diketo-1,3-dimethyl-1,2,3,4-tetrahydropyrimidin-6-yl)-2-thiourea A mixture of 31.0 grams (0.2 mole) of 6-amino-1,3-dimethyluracil and 30 ml. (excess) of butyl isothiocyanate in 400 ml. of dimethylformamide was heated at just below the reflux temperature for 1.5 hours. The reaction mixture was cooled to about 50° C. and then poured into crushed ice. A light yellow precipitate formed immediately, was collected on a filter and crystallized from methanol. The light yellow crystals of 1-butyl-3-(2,4-diketo-1,3-dimethyl-1,2,3,4-tetrahydropyrimidin-6-yl)-2-thiourea, M.P. 133–4° C., weighed 42.6 grams (78.8% of the theoretical) after drying.

Other examples of the uracil thioureas of the present invention were synthesized according to the procedure of the above examples. The analytical data determined for these compounds are set forth in the following table:

a trial dose of the test compound is used as the end point to provide the values given in the tables as the effective $BAD_{50}$ (median barbiturate antagonist dose). The margin of safety of the test compound is shown by the ratio of the $LD_{50}$ (median lethal dose) to the effective barbiturate antagonist dose.

In this procedure, the $LD_{50}$'s and $BAD_{50}$'s were determined by subjecting the mice to at least three logarithmically graded doses with ten mice at each dose level for each compound and calculating according to the procedure of Miller et al., Proc. Soc'y Exper. Biol. and Med., vol. 57, p. 261 (1944). The lethal dose of the barbiturate which was administered was the $LD_{90-100}$ (the dose required to kill at least 9 of every 10 mice), or 126 mg./kilo of body weight.

TABLE II.—BARBITURATE ANTAGONIST DATA ON URACIL THIOUREAS, MG./KG. IN MICE

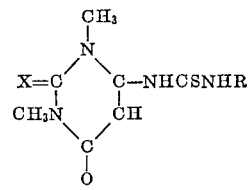

| X equals | R equals | LD₅₀ i.p. | BAD₅₀ i.p. | LD₅₀/BAD₅₀ |
|---|---|---|---|---|
| O | CH₃ | 25 | 4.5 | 5.55 |
| O | C₂H₅ | 3.0 | 1.57 | 1.91 |
| O | Allyl | 6.5 | 1.6 | 4.06 |
| S | do | 94 | 48 | 1.96 |
| O | i-C₃H₇ | 24 | 1.6 | 15.0 |
| O | n-C₃H₇ | 39.5 | 0.52 | 75.9 |
| O | Methallyl | ª 1,600 | 9.7 | 164 |
| O | i-C₄H₉ | 471 | 18 | 26.2 |
| O | n-C₄H₉ | 410 | 13 | 31.5 |
| O | C₆H₅ | ª 1,000 | 82 | 12.2 |

ª Three animals tested at each dose.

TABLE I.—ANALYTICAL DATA ON URACIL THIOUREAS

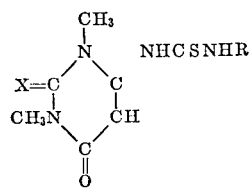

| | | Melting point, ° C. | Empirical formula | Analysis, percent | | | | | | | |
|---|---|---|---|---|---|---|---|---|---|---|---|
| | | | | Calculated | | | | Found | | | |
| X equals | R equals | | | C | H | N | S | C | H | N | S |
| O | CH₃ | 230-1 | C₈H₁₂N₄O₂S | 42.09 | 5.30 | 24.54 | 14.05 | 42.44 | 5.33 | 24.04 | 14.13 |
| O | C₂H₅ | 174-5 | C₉H₁₄N₄O₂S | 44.61 | 5.82 | | 13.23 | 44.81 | 5.81 | | 12.93 |
| O | Allyl | 197-8 | C₁₀H₁₄N₄O₂S | 47.23 | 5.55 | | 12.61 | 47.04 | 5.67 | | 12.31 |
| S | do | 194-5 | C₁₀H₁₄N₄O₂S | 44.42 | 5.22 | 20.72 | | 44.85 | 5.64 | 20.48 | |
| O | i-C₃H₇ | 169-71 | C₁₀H₁₆N₄O₂S | 46.29 | 6.29 | | 12.51 | 46.46 | 6.20 | | 12.89 |
| O | n-C₃H₇ | 155-6 | C₁₀H₁₆N₄O₂S | 46.86 | 6.29 | 21.86 | | 47.23 | 6.27 | 21.46 | |
| O | Methallyl | 150-2 | C₁₁H₁₆N₄O₂S | 49.23 | 6.01 | | 11.95 | 49.59 | 6.14 | | 11.85 |
| O | i-C₄H₉ | 140-1 | C₁₁H₁₈N₄O₂S | 48.87 | 6.71 | | 11.86 | 49.28 | 6.85 | | 11.83 |
| O | n-C₄H₉ | 133-4 | C₁₁H₁₈N₄O₂S | 48.87 | 6.71 | | 11.86 | 49.10 | 6.64 | | 11.82 |
| O | C₆H₅ | 212-4 | C₁₃H₁₄N₄O₂S | 53.78 | 4.86 | | 11.04 | 53.62 | 4.82 | | 11.42 |

Th desirable central nervous system anti-depressant properties of the uracil thiourea of this invention are illustrated by the activity of these compounds in protecting mice against lethal doses of pentobarbital sodium (barbiturate antagonist activity). These illustrative results are shown in the following Tables II and III in which the compounds of the present invention are compared with seven reference central nervous system anti-depressants. In this comparison, which is a modification of the procedure reported by Kimura and Richards, Arch. Intern. Pharmacodyn., vol. 110, pp. 29–42 (1957), the ability of the test compound to reverse a lethal dose of barbiturate is determined. The life or death of the test animals following administration of a lethal dose of the barbiturate and then

TABLE III.—REFERENCE CNS ANTI-DEPRESSANTS, MG./KG. IN MICE

| Name | LD₅₀ i.p. | BAD₅₀ i.p. | LD₅₀/BAD₅₀ |
|---|---|---|---|
| Picrotoxin | 9.2 | 4.8 | 1.9 |
| Bemegride sold under the trademark "Megimide." | 36 | 24 | 1.5 |
| Pentylenetetrazol sold under the trademark "Metrazol." | 90 | 39 | 2.3 |
| Methylphenidate sold under the trademark "Ritalin." | 96.5 | Inactive at 10–150. | |
| Ethamivan sold under the trademark "Emivan." | 37 | Inactive at 10–200. | |
| Caffeine citrate | 540 | Inactive at 35–500. | |
| Nikethamide | 245 | Inactive at 150–300. | |

From the results shown in the above tables it can be seen that five of the compounds of the present invention are more active than the seven reference compounds. Most importantly, the safety margins of eight of the novel compounds of the present invention are better than any of the reference compounds and six have safety margins greater than 10.

Various modifications, adaptations and further examples of the present invention can be devised, after reading the foregoing specification and the claims appended hereto, by the person skilled in the art without departing from the spirit and scope of the invention. Thus, it will be apparent that various mutual solvents other than dimethylformamide and dimethylsulfoxide can be used for the reaction of 6-amino-1,3-dimethyluracil with isothiocyanate to prepare the novel uracil thioureas of the present invention and various methods of purification of these novel compounds other than recrystallization from methanol will be apparent to those skilled in the art. So also, the reaction conditions of temperature, time and proportions of reactants can be modified from those illustrated in the specific examples. When solvent media is used for the synthesis of the uracil thioureas, it is preferred to use dimethylformamide at reflux temperature. When dimethylsulfoxide is used as solvent media, it is important to use a reaction temperature not above about 150° C., since at substantially higher temperatures this solvent will act as an oxidizing agent to produce the aforementioned thiazolopyrimidines instead of the herein desired uracil thioureas. In this synthesis the 6-amino-1,3-dimethyluracil or 6-amino-1,3-dimethylthiouracil is generally reacted with about a molar equivalent or an excess of the isothiocyanate at reflux temperatures. An effective barbiturate antagonist dose of the uracil thioureas can be formulated in any conventional dosage form for administration, including admixtures with many solid and liquid diluents, carriers and adjuvants other than those previously described. These dosages can be administered to revive animals given an overdose of barbiturates, sedatives and hypnotics such as, for example, pentobarbital sodium, phenobarbital, phenobarbital sodium, chloral hydrate and the like substances. All such variations, modifications and further examples are included within the scope of the invention as defined in the following claim.

What is claimed is:

1. The method of reviving an animal given an overdose of barbiturate comprising administering to said animal an effective barbiturate antagonistic dose of a uracil thiourea having the formula

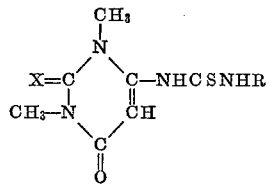

wherein X is selected from the group consisting of O and S, and wherein R is selected from the group consisting of lower alkyl having from 1 to about 4 carbon atoms, allyl, methallyl and phenyl.

References Cited

UNITED STATES PATENTS 3,105,077  9/1963  Muller et al. _____ 260—256.4

FOREIGN PATENTS 1,219,489  6/1966  Germany.

OTHER REFERENCES

Wagner et al., "Synthetic Organic Chemistry," 1953, pp. 645, 827–828.

JEROME D. GOLDBERG, Primary Examiner